United States Patent
Chen

(10) Patent No.: US 9,975,302 B2
(45) Date of Patent: May 22, 2018

(54) PRIMER LAYER COATING COMPOSITIONS

(75) Inventor: Fang Chen, Hallett Cove (AU)

(73) Assignee: CARL ZEISS VISION AUSTALIA HOLDINGS LIMITED, Lonsdale, South Australia (AU)

( * ) Notice: Subject to any disclaimer, the term of this patent is extended or adjusted under 35 U.S.C. 154(b) by 1760 days.

(21) Appl. No.: 12/158,476

(22) PCT Filed: Dec. 21, 2006

(86) PCT No.: PCT/AU2006/001985
§ 371 (c)(1),
(2), (4) Date: Jul. 23, 2008

(87) PCT Pub. No.: WO2007/070975
PCT Pub. Date: Jun. 28, 2007

(65) Prior Publication Data
US 2008/0311287 A1 Dec. 18, 2008

(30) Foreign Application Priority Data
Dec. 21, 2005 (AU) ................ 2005907159

(51) Int. Cl.
B29D 11/00 (2006.01)
C08F 283/06 (2006.01)
C09D 163/10 (2006.01)

(52) U.S. Cl.
CPC ...... *B29D 11/00865* (2013.01); *C08F 283/06* (2013.01); *C08F 283/065* (2013.01); *C09D 163/10* (2013.01); *Y10T 428/31551* (2015.04); *Y10T 428/31663* (2015.04); *Y10T 428/31938* (2015.04)

(58) Field of Classification Search
CPC ............ B29D 11/00865; C08F 283/06; C08F 283/065; C09D 163/10; Y10T 428/31663; Y10T 428/31551; Y10T 428/31938
USPC .................................. 427/160–169
See application file for complete search history.

(56) References Cited

U.S. PATENT DOCUMENTS

| | | |
|---|---|---|
| 3,432,225 A | 3/1969 | Rock |
| 3,565,509 A | 2/1971 | Sulzbach |
| 4,022,947 A | 5/1977 | Grubb et al. |
| 5,332,618 A | 7/1994 | Austin |
| 6,051,310 A | 4/2000 | Cano et al. |
| 6,284,162 B1* | 9/2001 | Kingsbury et al. ............ 264/2.2 |
| 6,551,710 B1* | 4/2003 | Chen et al. ................... 428/412 |
| 6,551,770 B2 | 4/2003 | Hirabayashi |
| 2003/0118833 A1 | 6/2003 | Valeri et al. |
| 2003/0205317 A1* | 11/2003 | Ha ............................ 156/275.7 |
| 2005/0165141 A1 | 7/2005 | Wolf et al. |

FOREIGN PATENT DOCUMENTS

| | | |
|---|---|---|
| EP | 0 699 926 B1 | 3/1996 |
| EP | 0 763 581 B1 | 3/1997 |
| JP | 59-78304 A | 5/1984 |
| JP | 2005-194485 A | 7/2005 |
| WO | WO 00/075241 A2 | 12/2000 |
| WO | WO 01/21375 A1 | 3/2001 |
| WO | WO 02/096627 A1 | 12/2002 |
| WO | WO 02/096628 A2 | 12/2002 |

OTHER PUBLICATIONS

I. Yilgor et al, "Synthesis and Characterization of Free Radical Cured Bis-Methacryloxy Bisphenol-A Epoxy Networks", Apr. 1983, Polymer Composites, vol. 4 No. 2, pp. 120-125.*
International Search Report.

* cited by examiner

Primary Examiner — Michael P Wieczorek
Assistant Examiner — Michael G Miller
(74) Attorney, Agent, or Firm — Buchanan Ingersoll & Rooney, PC

(57) ABSTRACT

The present invention provides a coated optical element including an optical substrate and a primer layer that is formed by cationic polymerisation of a coating composition containing an effective amount of an epoxy monomer and a vinyl ether monomer. The optical element may be an ophthalmic lens.

24 Claims, No Drawings

PRIMER LAYER COATING COMPOSITIONS

This application claims priority from Australian Provisional Patent Application No. 2005907159 filed on 21 Dec. 2005, the contents of which is to be taken as incorporated herein by this reference.

FIELD OF THE INVENTION

The present invention relates to a coating composition that can be used to form a primer layer on coated optical elements, such as ophthalmic lenses. The primer layer confers impact resistance on optical elements having an anti-reflection coating and also assists with adhesion of adjacent coating layers. The invention also relates to optical elements, especially ophthalmic lenses, containing the primer layer, and to methods for forming impact resistant AR coated optical elements.

BACKGROUND OF THE INVENTION

Plastic materials are widely used as substitutes for glass in many applications, and particularly for optical elements such as ophthalmic lenses. Plastic materials have a number of advantages over glass, such as lighter weight, ease of handling and ease of formation of articles. However, plastic materials rarely have all of the physical and/or optical properties required for a particular application. Most notably, plastic materials are soft and scratch quite readily in comparison to glass.

It has become customary to coat plastic optical elements with coatings to provide them with the desired physical or optical properties. For example, plastic optical elements such as ophthalmic lenses are generally coated with abrasion resistant "hard coats" to reduce abrasion on the surface of the element. Furthermore, optical elements such as ophthalmic lenses often include an anti-reflection ("AR") coating to improve transmittance of visible light.

Whilst coatings, such as hard coats and AR coats, can be advantageous in terms of improving the optical or physical properties of an optical element, they can also lead to problems. For example, there can be problems with adhesion of hard coating layers to an optical element, or to other coating layers, and AR coatings are brittle and they crack relatively easily. These problems can reduce the product life of optical elements containing these coatings.

The problem of cracking of AR coated optical elements has become more prevalent in recent times in the ophthalmic lens field because of a trend towards thinner lenses. For aesthetic reasons, lenses having a centre thickness of about 1 mm are sought after. Prior to these thinner lenses being made available, lenses having a centre thickness of 1.5 mm and 2.0 mm were more common. The trend toward thinner lenses has emphasized problems with cracking of the coatings. Clearly, there is a need for optical elements, such as ophthalmic lenses, having an AR coating and also having improved impact resistance.

The prior art contains a number of suggestions for providing primer layers for improving the impact resistance of optical elements and the adhesion of coating layers on the optical element. U.S. Pat. No. 6,051,310 to Cano et al. describes an ophthalmic lens having an abrasion resistant coating, a layer of impact resistant primer, and an inorganic AR coating. The primer layer, which is inserted between the abrasion resistant coating and the AR coating, is formed using an epoxysilane based polymer. U.S. Pat. No. 6,551,710 to the present applicants also describes a primer composition that can be used to form impact resistant primer layers on ophthalmic lenses having hard coats and AR coats. The primer layer is formed using a thiolene based polymer. Published United States patent application 2003/0118833 to Essilor describes the formation of a primer layer from a non-hydrophilic acrylate monomer and an epoxy monomer.

Some of the prior art primer layers referred to above may lead to an improvement in the impact resistance of an optical element. However, coatings of this type can lead to further problems resulting from poor adhesion of the optical element substrate and/or the coatings to the primer layer. Poor adhesion subsequently reduces the product life of the optical element. For example, we have found that it is necessary to pre-treat the surface of an ophthalmic lens with corona discharge prior to depositing the primer layer described in U.S. Pat. No. 6,551,710 in order to enhance adhesion of the primer layer to the lens. This additional step adds to the final cost of production of a lens.

It is an aim of the present invention to provide a coated optical element having a primer layer that improves impact resistance and adhesion and preferably overcomes or alleviates a problem with the prior art, or at the very least provides manufacturers with a viable alternative to existing technology.

A reference herein to a patent document or other matter which is given as prior art is not to be taken as an admission that that document or matter was known or that the information it contains was part of the common general knowledge.

SUMMARY OF THE INVENTION

The present invention provides a coated optical element including an optical substrate and a primer layer, the primer layer being formed by cationic polymerisation of a coating composition containing an effective amount of:
  an epoxy monomer; and
  a vinyl ether monomer.

The present invention also provides a method of preparing an optical element having a primer layer, the method including:
  providing an optical element;
  coating a surface of the optical element with a coating composition containing an effective amount of:
    i. an epoxy monomer; and
    ii. a vinyl ether monomer; and
  cationically polymerising the coating composition to form the primer layer on the optical element.

Furthermore, the present invention provides a method of preparing an optical element having a primer layer, the method including:
  coating a surface of a mould section used to manufacture the optical element with a coating composition containing an effective amount of:
    an epoxy monomer; and
    a vinyl ether monomer;
  cationically polymerising the coating composition;
  assembling a mould containing the mould section;
  filling the mould with a cross-linkable polymeric casting composition; and
  polymerising the casting composition so as to form the optical element having the primer layer on a surface;
  removing the optical element from the mould; and
  optionally, coating the optical element with one or more further coating layers.

The present invention also provides a coating composition including an epoxy monomer and a vinyl ether monomer in amounts effective to form a primer layer on a surface of an optical element after cationic polymerisation of the coating composition.

As used herein, a "primer layer" is a coating or layer that improves the impact resistance of an optical element and/or assists with adhesion of adjacent coating layers or optical substrate materials. For example, the primer layer may improve the impact resistance of optical elements having an anti-reflection coating. Alternatively, or in addition, the primer layer may increase adhesion between an abrasion resistant coating and an optical element substrate. Primer layers of the type described herein are sometimes referred to as "impact resistant primer layers" or simply "impact resistant layers".

The optical element preferably has one or more further coating layers over the primer layer. In an embodiment of the invention the further coating layer is an AR coating. In another embodiment the further coating layer is an abrasion resistant coating. In a specific embodiment, the optical element has an abrasion resistant coating as well as an AR coating. The abrasion resistant coating may be coated onto the primer layer, with the AR coating over the abrasion resistant coating, although variations to that arrangement are also contemplated. The further coating layer may also be a photochromic layer, being a layer of polymer containing one or more photochromic dyes.

In an embodiment of the invention the coating composition contains 2 to 8% by weight of the epoxy monomer, and 8 to 16% by weight of the vinyl ether monomer. In another embodiment the coating composition contains 4 to 6% by weight of the epoxy monomer, and 10 to 14% by weight of the vinyl ether monomer.

The vinyl ether monomer may be an alkyl vinyl ether, an alkoxyalkyl vinyl ether, a hydroxyalkyl vinyl ether, a vinyl ether resin, or a mixture of two or more of the aforementioned. In one embodiment of the invention the vinyl ether monomer is an aliphatic urethane divinyl ether such as the one sold under the trade name Vectomer 2020 by Morflex.

The epoxy monomer may be selected from the group consisting of ethylene glycol diglycidyl ether, diethylene glycol diglycidyl ether, polyethylene glycol diglycidyl ether, propylene glycol diglycidyl ether, dipropylene glycol diglycidyl ether, tripropylene glycol diglycidyl ether, polypropylene glycol diglycidyl ether, neopentyl glycol diglycidyl ether, 1,6 hexanediol diglycidyl ether, glycerine diglycidyl ether, trimethylol propane triglycidyl ether (such as Epolight 100MF), bisphenol-A diglycidyl ether (BPADGE), bisphenol-F diglycidyl ether, and their extended chain analogs, 1,4-butanediol diglycidyl ether, diglycidyl ethers of tetrabromo-bisphenol-A, epoxy based ethers of 4,4'-biphenylene, such as 4,4'-diglycidyloxybiphenyl. In an embodiment of the invention the epoxy monomer is trimethylol propane triglycidyl ether.

The coating composition may also contain a cationic photoinitiator and a solvent. The photoinitiator may be a UV photoinitiator. The photoinitiator may be present in the composition in an amount of 0.5 to 4% by weight, or an amount of 1 to 3% by weight.

In an embodiment of the invention, the coating composition also contains a supplementary polymerisable monomer (in addition to the epoxy monomer and the vinyl ether monomer). The supplementary polymerisable monomer may be any monomer having a polymerisable double bond. In an embodiment of the invention the supplementary polymerisable monomer is a (meth)acrylate monomer. As used herein, the term "(meth)acrylate" is used to denote either an acrylate or a methacrylate group. The supplementary polymerisable monomer may be cationically polymerisable, or radically polymerisable. In the latter case, the composition may also contain a free radical photoinitiator.

The primer layer may be coated directly onto a surface of the optical element. An abrasion resistant coating may then be applied prior to the deposition of an anti-reflection (AR) coating. Thus, the optical element may be a multilayer optical element having a primer layer as described herein, an abrasion resistant coating, and an AR coating.

The optical element may be any optically transparent material. Examples of materials or substrates that may benefit from use of the present invention include lenses such as ophthalmic lenses, camera lenses, and instrument lenses. Other products such as domestic, commercial or residential window sheets or windows, motor vehicle windscreens or windows, transparent display panels and the like could also benefit from the present invention. In an embodiment of the invention, the optical element is an ophthalmic lens.

The optical element may be formed from any one of a variety of plastic substrates. For example, the optical element may be formed from a plastic selected from the group including CR-39™, multi-functional acrylates, polythiourethanes, thioesters, episulfide polymers, polycarbonate and the like. In an embodiment of the invention the optical element is formed from a thermoset material, such as CR-39™, episulfide-based polymers, multi-functional acrylates, or polythiourethanes. Whilst the requirements for impact resistance with thermoplastic substrates is not as great as it is for thermoset substrates, the primer layer of the present invention may be used on thermoplastic substrates to enhance adhesion between the substrate and an adjacent coating layer, or between adjacent coating layers.

One particular embodiment of the present invention provides a multilayer coated lens including:
  a lens having a front surface and a back surface;
  a primer layer on the front and/or back surface of the lens, wherein the primer layer is formed by cationic polymerisation of a coating composition containing an effective amount of:
    i. an epoxy monomer; and
    ii. a vinyl ether monomer;
  an abrasion resistant coating on the primer layer; and
  an anti-reflection coating layer on the abrasion resistant coating.

DETAILED DESCRIPTION OF THE INVENTION

The present invention provides a coated optical element. It will be evident from the embodiments described herein that in one form of the invention the optical element is a lens, such as an ophthalmic lens. However, it will be appreciated that the methods and compositions described could also be applied to other plastic optically transparent substrates.

The primer layer of the present invention improves adhesion and also impact resistance. Therefore, the primer layer will have a benefit when it is used between materials to increase adhesion between the materials. For example, the primer layer will improve adhesion between a substrate and a siloxane- or a (meth)acrylate-based abrasion resistant coating. The primer layer of the present invention is also of benefit when it is used on lenses having an anti-reflection (AR) coating. This is because AR coatings tend to be glassy and brittle and any lack of impact resistance of a lens is particularly noticeable in lenses of this type. The primer layer of the present invention provides a degree of impact resistance to AR coated lenses. Furthermore, the thickness of the lens also affects the impact resistance of a lens. For aesthetic reasons, there has been a trend toward making lenses as thin as possible, and lenses with a centre thickness of about 1.0 mm are now readily available. However, thinner lenses also have a lower impact resistance.

The primer layer is formed by cationic polymerisation of a coating composition containing an effective amount of an epoxy monomer and a vinyl ether monomer. The epoxy monomer and the vinyl ether monomer are present in the composition in amounts effective to form a primer layer on an optical element after cationic polymerisation of the coating composition. As used herein, reference to formation of the primer layer "on an optical element" means that the primer layer is either formed directly on a surface of the optical element, or that the primer layer is formed on a coating that is on a surface of the optical element. An example of the latter case is an optical element having a first abrasion resistant coating on the optical element, the primer layer on the first abrasion resistant coating, and a second abrasion resistant coating on the primer layer. Optionally, an AR coating can then be formed on the second abrasion resistant coating.

The coating composition may contain: 2 to 8%, and more preferably 4 to 6%, of the epoxy monomer; 8 to 16%, and more preferably 10 to 14% of the vinyl ether monomer. Unless otherwise specified, the percentages stated herein are weight percent based on the total weight of the composition.

The vinyl ether monomer may be an alkyl vinyl ether, an alkoxyalkyl vinyl ether, a hydroxyalkyl vinyl ether, a vinyl ether resin, or a mixture of two or more of the aforementioned. Vinyl ethers having two or more double bonds may be referred to as polyvinyl ethers. The polyvinyl ether could be 1,3-benzenedicarboxylic acid, bis[4-(ethenyloxy)butyl] ester; pentanedioic acid, bis[[4-[(ethenyloxy)methyl]cyclohexyl]methyl]ester; butanedioic acid, bis[4-ethenyloxy)butyl]ester; hexanedioic acid, bis[4-(thenyloxy)butyl]ester; carbamic acid, (methylenedi-4,1-phenylene)bis-, bis[4-(ethenyloxy)butyl]ester; carbamic acid, (4-methyl-1,3-phenylene)bis-, bis[4-(ethenyloxy)butyl]ester; 1,2,4-benzenetricarboxylic acid, tris[4-ethenyloxy)butyl]ester; Vectomer 1221 (an aromatic polyester divinyl ether); Vectomer 1222 (an aromatic polyester divinyl ether); Vectomer 2010 (an aromatic urethane divinyl ether); Vectomer 2020 (an aliphatic urethane divinyl ether); Vectomer 2031 (an aromatic urethane divinyl ether); or Vectomer 2032 (an aromatic urethane divinyl ether). We have found that Vectomer 2020 (a product of Morflex, Inc that is commercially available from Sigma-Aldrich) is particularly suitable for use in the present invention.

To provide a primer layer having a high enough cross link density, the epoxy monomer preferably has an average of two or more epoxy groups per molecule Therefore, the epoxy monomer is preferably a polymerisable monomer having two or more epoxy groups. As used herein, the term epoxy group refers to a group of formula Error! Objects cannot be created from editing field codes.

The epoxy monomer may fall into one or more of the following classes: internal, terminal, mono-functional, di-functional, tri-functional, tetra-functional, aliphatic, aromatic, cyclic, esters, ethers, and amines. Epoxy monomers that can be used include, but are not limited to, difunctional, trifunctional and other multi-functional epoxy monomers. Specific examples of polymerisable epoxy monomers include ethylene glycol diglycidyl ether, diethylene glycol diglycidyl ether, polyethylene glycol diglycidyl ether, propylene glycol diglycidyl ether, dipropylene glycol diglycidyl ether, tripropylene glycol diglycidyl ether, polypropylene glycol diglycidyl ether, neopentyl glycol diglycidyl ether, 1,6 hexanediol diglycidyl ether, glycerine diglycidyl ether, trimethylol propane triglycidyl ether, bisphenol-A diglycidyl ether (BPADGE), bisphenol-F diglycidyl ether, and their extended chain analogs, 1,4-butanediol diglycidyl ether, diglycidyl ethers of tetrabromo-bisphenol-A, epoxy based ethers of 4,4'-biphenylene, such as 4,4'-diglycidyloxybiphenyl. We have found that trimethylol propane triglycidyl ether is particularly suitable for use in the present invention.

The coating composition also contains a cationic photoinitiator, which is required for polymerisation of epoxy monomers. Any of the many compounds known to initiate polymerization by a cationic mechanism may be used. The cationic photoinitiator is preferably a UV activated initiator. Compounds known to initiate polymerisation by a cationic mechanism include, for example, diaryliodonium salts, triarylsulfonium salts, diaryliodosonium salts, dialkylphenylsulfonium salts, dialkyl(hydroxydialkylphenyl)sulfonium salts and ferrocenium salts. Such salts may be modified by the attachment of alkyl, alkoxy, siloxy and the like groups. Particularly useful initiators include (4-n-decyloxyphenyl)phenyliodonium hexafluoroantimonate (IOC10), (4-n-decyloxyphenyl)diphenylsulfonium hexafluoroantimonate (SOC10) and S-methyl-S-n-dodecylphenacylsulfonium hexafluoroantimonate (DPS-$C_1 C_{12}$).

The amount of polymerisation initiator used and the conditions of polymerisation will be readily determined by those skilled in the art, or can easily be determined empirically. Typically, the polymerisation initiator is employed in concentrations ranging from 0.5 to 4% by weight based on the total weight of the coating composition. Most preferably the polymerisation initiator is employed in concentrations of 1 to 3% by weight based on the total weight of the coating composition.

The composition also includes a solvent. If a thermoplastic material (for example a polycarbonate polymer of bisphenol A) is to be coated, the composition contains a mixture of a ketone solvent, such as methyl isobutyl ketone, and a lower alcohol solvent, such as isopropyl alcohol. In the case of thermoplastic substrates, ketone solvents affect the polymer network of an adjoining polymer layer or substrate, whilst the substrate tends to be inert to lower alcohol solvents. Therefore, by using an appropriate mixture of ketone and lower alcohol solvent it is possible to promote adhesion of the primer layer to a thermoplastic substrate, such as polycarbonate.

In the case of a thermoset material, the choice of solvent is not critical. Whilst not wishing to be bound by theory, we think that adhesion of the primer layer onto thermoset materials is assisted by epoxy groups of the primer layer reacting with the hydroxyl groups or other reactive functional groups on the surface of the substrate. Any of the thermoset polymers that are used in the art may be coated using the methods described herein. Common thermoset polymers include a polymer of diethylene glycol bis(allyl carbonate) (e.g. CR-39™, a trade mark of PPG Industries, Inc), a polyacrylate copolymer (e.g. Spectralite™, a trade mark of Sola International Inc.), a thiolene polymer (e.g. Finalite™, a trade mark of Sola International Inc.), an episulfide polymer, or a thiourethane polymer.

Optionally, the coating composition may contain a supplementary polymerisable monomer in addition to the epoxy monomer and the vinyl ether monomer. The supplementary polymerisable monomer may be any monomer having a polymerisable double bond. (Meth)acrylate monomers have been found to be particularly suitable as they provide some flexibility in the formulation. For example, the supplementary polymerisable monomer may be used to improve tint rate, hardness, abrasion resistance, adhesion, solvent resistance, and the like of the primer layer. The supplementary polymerisable monomer may be a compound having greater than one acrylate moiety per molecule. Examples include, but are not limited to, di-, tri-, tetra- and higher acrylates or methacrylates, urethane monomers having 2 to 6 terminal acrylic or methacrylic groups, fluorene acrylates or methacrylates, and thioacrylate or thiomethacrylate monomers, and high rigidity, high Abbe number acrylic or methacrylic monomers.

Suitable thiodiacrylate or dimethacrylate monomers may be selected from bis(4-methacryloylthioethyl)sulfide (BMTES) and bis(4-methacryloylthiophenyl)sulfide (BMTS). Suitable fluorene diacrylate or dimethacrylate monomers may be selected from a bisphenol fluorene dihydroxy acrylate (BFHA) or a bisphenol fluorene dimethacrylate (BFMA) or mixtures thereof. The (meth)acrylate supplementary polymerisable monomer may be a polyoxy alkylene glycol diacrylate or dimethacrylate which includes ethylene oxide or propylene oxide repeating units in its backbone. Suitable materials include dimethylacrylates where the number of repeating ethylene oxide groups is between 4 and 14. Suitable materials include those sold under the trade names NK Ester 4G, 6G, 9G or 16G. Suitable high rigidity, High Abbe number acrylic or methacrylic monomers may be selected from acrylates or methacrylate derivatives of a cycloolefin, for example a tricyclodecane dimethanol diacrylate or methacrylate.

A highly rigid acrylic or methacrylic monomer may be selected from highly rigid, high Abbe Number polyfunctional acrylates or methacrylates, such as pentaerythritol tetracrylate (PTA).

Illustrative examples of suitable (meth)acrylate monomers include 1,4-butanediol diglycidylether di(meth)acrylate, bisphenol-A diglycidylether dimethacrylate, neopentylglycol diglycidylether di(meth)acrylate, N,N-bis(2-hydroxyethyl)(meth)acrylamide, methylenebis((meth)acrylamide), 1,6-hexamethylenebis((meth)acrylamide), diethylenetriamine tris((meth)acrylamide), bis(gamma-((meth)acrylamide)propoxy)ethane, beta-((meth)acrylamide) ethylacrylate, ethylene glycol di((meth)acrylate)), diethylene glycol di(meth)acrylate, tetraethylene glycol di(meth)acrylateglycerol di(meth)acrylate, glycerol tri (meth)acrylate, 1,3-propylene glycol di(meth)acrylate, dipropyleneglycol di(meth)acrylate, 1,4-butanediol di(meth) acrylate, 1,2,4-butanetriol tri(meth)acrylate, 1,6-hexanedioldi(meth)acrylate, 1,4-cyclohexanediol di(meth)acrylate, 1,4-benzenediol di(meth)acrylate, pentaerythritoltetra(meth) acrylate, 1,5-pentanediol di(meth)acrylate, trimethylolpropane di(meth)acrylate, trimethylolpropane tri(meth)acrylate), 1,3,5-triacryloylhexahydro-1,3,5-triazine, 2,2-bis(4-(2-(meth)acryloxyethoxy)phenyl)propane, 2,2-bis(4-(2-(meth)acryloxyethoxy)-3,5-dibromophenyl)propane, 2,2-bis ((4-(meth)acryloxy)phenyl)propane, and 2,2-bis((4-(meth) acryloxy)-3,5-dibromophenyl)propane.

In addition to the acrylate monomers described above, any of the following monomers may also be used: 1,4-butanediol di(meth)acrylate, 1,4-butanediol dimethacrylate, 1,3-butanediol glycol diacrylate, 1,3-butylene glycol dimethacrylate, cyclohexane dimethanol diacrylate, cyclohexane dimethanol dimethacrylate, diethylene glycol diacrylate, diethylene glycol dimethacrylate, dipropylene glycol diacrylate, ethylene glycol dimethacrylate, 1,6-hexanediol di(meth)acrylate, neopentyl glycol di(meth)acrylate, polyethylene glycol di(meth)acrylate, tetraethylene glycol di(meth)acrylate, triethylene glycol di(meth)acrylate, tripropylene glycol di(meth)acrylate, and the like; and tetrafunctional and pentafunctional monomers such as dipentaerythritol penta(meth)acrylate, di-(trimethylolpropane) tetra(meth)acrylate, dipentaerythritol penta(meth)acrylate ester, pentaerythritol tetra(meth)acrylate.

Suitable urethane acrylate monomers include urethane (meth)acrylates, such as CN962, CN964, CN965, CN980, CN9782 and other urethane acrylates sold by Sartomer Company.

Suitable acrylate monomers may further include Epoxy Acrylate CN 120 AC16, Polybutadiene Urethane Diacrylate CN 302, Polybutadiene Dimethacrylate CN 303, (Meth) Acrylate Functional Monomer P-Cure 300, and (Meth) Acrylate Functional Monomer P-Cure 301; functional acrylic oligomers, such as the functional acrylic oligomers sold by Sartomer Company under the tradename SARCRYL® as SARCRYL® Functional AcrylicSarcryl CN816, SARCRYL® Functional AcrylicSarcryl CN817, SARCRYL® Functional AcrylicSarcryl CN818, Amine Modified Polyether Acrylate CN 501, Amine Modified Polyether Acrylate CN 502, Amine Modified Polyether Acrylate CN 550, Amine Modified Polyether Acrylate CN 551, Alkoxylated Trifunctional Acrylate Ester such as SR 9008 sold by Sartomer Co., Metallic Diacrylate SR 9016, and metallic diacrylates such as zinc diacrylate, lithium diacrylate, sodium diacrylate, magnesium diacrylate, calcium diacrylate, aluminum diacrylate, Monofunctional Acid Ester CD 9050, Trifunctional Acid Ester CD 9051 and CD 9052, Trifunctional Acrylate Ester SR 9012, and Trifunctional Methacrylate Ester SR 9009 and SR 9011.

The supplementary polymerisable monomer may be cationically polymerisable, or radically polymerisable. In the latter case, the composition may also contain a free radical photoinitiator. The free radical initiator may be a heat- or UV-activated initiator.

Suitable free radical initiators include any one or more of: azodiisobutyronitrile (AIBN); 2,2'-azobis(N,N'-dimethyleneisobutyramidine)dihydrochloride; 2,2'-azobis(2-amidinopropane)dihydrochloride; 2,2'-azobis(N,N'-dimethyleneisobutyramidine); 4,4'-azobis(4-cyanopentanoic acid); 2,2'-azobis{2-methyl-N-[1,1-bis(hydroxymethyl)-2-hydroxyethyl]propionamide}; 2,2'-azobis{2-methyl-N-[1,1-bis(hydroxymethyl)ethyl]propionamide}; 2,2'-azobis[2-methyl-N-(2-hydroxyethyl)propionamide]; 2,2'-azobis (isobutyramide)dihydrate; 2,2'-azobis(4-methoxy-2,4-dimethylvaleronitrile); 2,2'-azobis(2,4-dimethylvaleronitrile); 2,2'-azobisisobutyronitrile; dimethyl 2,2'-azobis-isobutyrate; 2,2'-azobis(2-methylbutyronitrile); 1,1'-azobis(1-cyclohexanecarbonitrile); 2-(carbamoylazo)-isobutyronitrile; 2,2'-azobis(2,4,4-trimethylpentane); 2-phenylazo-2,4-dimethyl-4-methoxyvaleronitrile; 2,2'-azobis(2-methylpropane); Trigonox TX-29 (Dialkyl Peroxide radical heat initiator); 1,1-di-(-butyl peroxy-3,3,5-trimethyl cyclohexane) TBPEH (Alkyl Perester radical heat initiator); t-butyl per-2-ethylhexanoate (Diacyl Peroxide radical heat initiator); benzoyl peroxide (Peroxy Dicarbonate radical heat initiator); ethyl hexyl percarbonate (Ketone Peroxide radical heat initiator); methyl ethyl ketone peroxide; triaryl sulfonium hexafluoroantimonate; Lucirin TPO (radical photoinitiator); 2,4,6-trimethylbenzoyidiphenylphosphine oxide; Irgacure 819; bis(2,4,6-trimethylbenzoyl)-phenyl-phosphine oxide; 1-bis(2,6-dimethoxybenzoyl)-2,4,4-trimethylpentyl phosphineoxide; Vicure 55; methyl phenylglycoxylate; bis (t-butyl peroxide)diisopropylbenzene; t-butyl perbenzoate; t-butyl peroxy neodecanoate; Amicure DBU; Amicure BDMA; DABCO; polycat SA-1; polycat SA-102; polycat SA-610/50; aluminium acetyl acetonate; dibutyltin dilaurate; dibutyltin oxide; Darocur 1173; Irgacure 184; Irgacure 500; Irgacure 1800; and Irgacure 1850.

From the foregoing, it will be evident that the present invention also provides a coating composition including:
an epoxy monomer; and
a vinyl ether monomer;
in amounts effective to form a primer layer on a surface of an optical element after cationic polymerisation of the coating composition.

Any of the techniques that are used for that purpose in the art can be used to coat the optical element, including dip coating, spin coating, flow coating, spray coating and in-mould coating.

Depending on the use of the optical element, all or part of any of the surface(s) of the element may be coated. Most improvement in impact resistance using the primer layer of the present invention is seen when it is used with AR coated lenses. To achieve a desirable level of impact resistance, the primer layer needs to be coated onto any surface that will contain an AR coating. In the case of an ophthalmic lens having a concave back surface and a convex front surface, one or both surfaces may be coated with the primer layer. However, if only one surface is coated with the primer layer, the primer layer is most effective for impact resistance when it is coated onto the back surface of an AR coated lens. In that case, the primer layer of the present invention will be deposited so that it is between the lens and the abrasion resistant coating. Alternatively, this primer-hard coat-AR coat sequence of coatings could be applied to the front and back surfaces of a lens.

After coating onto the substrate, the primer layer coating composition is cured using a photoinitiated cationic curing step. Most preferably, the composition is cured by UV initiated cationic polymerisation. Ionic polymerisation enables epoxy groups of the epoxy monomer to react with free hydroxyl or other functional groups on the surface of a thermoset material.

Ideally, the primer layer will have a thickness in the range of 100 to 3,000 nm, and more preferably in the range of 500 to 2000 nm.

The optical element of the present invention is a multi-layer optical element having an impact resistant primer layer as described herein, an abrasion resistant coating, and an anti-reflection (AR) coating.

The material of the abrasion resistant coating may include siloxane based systems together with organic coatings including heat curable epoxies and polyurethane resins and ultra violet light curable acrylic resins. Ideally, the abrasion resistant coating will have a thickness in the range of 500 to 10,000 nm, more preferably in the range of 1000 to 5000 nm, although most preferably in the range of 1500 to 3000 nm.

The AR coating is a substantially transparent multilayer inorganic film that is applied to substantially eliminate reflection over a relatively wide portion of the visible spectrum. Known anti-reflection coatings include multilayer films including alternating high and low refractive index materials (e.g., metal oxides). AR coating of this type are described in U.S. Pat. Nos. 3,432,225, 3,565,509, 4,022,947, and 5,332,618. AR coatings can also employ one or more electrically conductive high and/or electrically conductive low refractive index layers. The thickness of the AR coating will depend on the thickness of each individual layer in the multilayer film and the total number of layers in the multi-layer film. Preferably, the AR coating is about 100 to about 750 nm thick. For use with ophthalmic lenses, the AR coating is preferably about 220 to about 500 nm thick. Inorganic anti-reflective coatings can be single-layer systems, but more generally are multi-layer anti-reflective stacks deposited by vacuum evaporation, deposition, sputtering, ion plating, and/or ion bean assisted methods.

For example, the AR coating method may include the evaporation of a source material in a gas phase, such as the evaporation of an indium oxide/tin oxide material in an argon-oxygen gas mixture. Other suitable source materials, gaseous atmospheres and ion assistance may be utilised as necessary. For example, another suitable source material is envisaged to be a doped zinc oxide where the dopant may be aluminium, boron, phosphor or indium.

Another method for coating a substrate with an AR coating involves the use of sputtering techniques. In reactive sputtering, a reactant gas forms a compound with the material that is sputtered from the target. When the target is silicon and the reactive gas is oxygen, for instance, silicon oxides, usually in the form of $SiO_2$, are formed on the surface of the substrate. Another sputtering technique is to first form a sputtered metal layer on a substrate and thereafter expose this layer to a reactive gas (such as oxygen) to form a metal oxide.

The optical element may be any optically transparent material. Examples of materials or substrates that may benefit from use of the present invention include lenses such as ophthalmic lenses, camera lenses, and instrument lenses. Other products such as a domestic, commercial or residential window sheets or windows, motor vehicle windscreens or windows, transparent display panels and the like could also benefit from the present invention. In a particularly preferred form of the invention, the optical element is an ophthalmic lens.

The optical element may be formed from any one of a variety of plastic substrates, but is preferably formed from a plastic selected from the group consisting of CR-39™, multi-functional acrylates, polythiourethanes, thioesters, polycarbonate and the like. Most preferably, the optical element is formed from a thermoset material, such as CR-39™, episulfide polymers, multi-functional acrylates, or polythiourethanes. It will be evident that one particular embodiment of the present invention provides a multilayer coated lens including:
a lens having a front surface and a back surface;
a primer layer on a front and/or back surface of the lens, wherein the primer layer is formed by cationic polymerisation of a coating composition containing an effective amount of:
an epoxy monomer; and
a vinyl ether monomer;
an abrasion resistant coating on the primer layer; and
an anti-reflection coating on the abrasion resistant coating.

The optical element could include more coating layers than the three coating layers of the primer layer-hard coat layer-AR coat system. For example, the optical element could include two hard coat layers and the primer layer of the present invention could be between the two hard coat layers. Thus, a first hard coat layer could be deposited on a surface of the optical element, the primer layer could then be deposited on the first hard coat layer, and a second hard coat layer could then be deposited on the primer layer. The optical element could then be coated with an anti reflection stack. Further top coat layers, such as slippery coats could also be added to the multilayer coated optical element. Alternatively, the optical element could include a photochromic layer. Methods for preparing photochromic layers are known in the art and generally involve forming a polymeric film (such as a film formed from a blend of polyoxyalkylene glycol dimethacrylate with urethane methacrylate) and introducing a photochromic material into the film. The photochromic layer may be between the primer coating and a hard coating, in which case the added adhesion provided by the primer layer may be beneficial.

From the foregoing discussion, it will also be evident that the present invention also provides a method of preparing an optical element having a primer layer, the method including:
   providing an optical element;
   coating a surface of the optical element with a coating composition containing an effective amount of:
      an epoxy monomer; and
      a vinyl ether monomer;
   cationically polymerising the coating composition; and
   forming further coating on the optical element.

However, the present invention also includes within its scope the production of coated optical elements using in-mould coating processes. In mould coating processes are known in the art—for example see published International patent application WO 01/21375, which is incorporated herein by reference solely for the purpose of exemplifying in-mould coating processes.

An in-mould coating process involves applying an abrasion resistant coating composition to a surface of a mould section. The composition is then partially cured. The primer layer coating composition is then applied over the partially polymerised abrasion resistant coating and it is partially polymerised by UV initiated cationic polymerisation. Mould pieces are then fitted together to form a mould cavity that is coated with the abrasion resistant coating composition and the impact resistant primer layer in a partially polymerised form. Cross-linkable polymeric casting composition is then poured into the mould and the plastic is cured so as to form the optical element with the impact resistant coating on the surface. The moulded article is finally removed from the mould to provide the coated article. The AR coating is then applied as described previously. This then provides an in-mould coating process for forming an optical element that has a good level of impact resistance and good adhesion between the optical element substrate and the abrasion resistant coating.

DESCRIPTION OF EMBODIMENTS OF THE INVENTION

Several examples will now be provided, together with various comparative examples, in order to illustrate preferred embodiments of the present invention. However, it is to be understood that the following description is not to limit the generality of the above description.

Example 1

Primer Solution Formulation A

| Components | | Weight(grams) |
|---|---|---|
| BYK-371 | Leveling agent made by BYK chemie | 0.03 |
| Vectomer ™ 2020 | Vinyl ether monomer made by Morflex | 12 |
| Epolight 100MF | Epoxy monomer made by Kyoeisha | 5.3 |

-continued

| Components | | Weight(grams) |
|---|---|---|
| Triaryl Sulfonium hexafluoroantimonate (50% in propylene carbonate) | Cationic UV initiator from Aldrich | 2.7 |
| Isopropyl Alcohol | Solvent, alcohol | 23 |
| Methyl Isobutyl Ketone | Solvent, ketone | 57 |
| Total | | 100.03 |

The lens samples used in this impact test were all −2.00 Stock lenses with centre thickness about 1 mm. The lenses can be cast or surfaced to the right through power and centre thickness.

Lenses from different materials were used. The materials were CR-39™, Spectralite™, Finalite™, MR7™ and MR10™. CR-39™ is an allyl diglycol carbonate resin marketed by PPG Industries. Spectralite™, which is a polymeric casting composition that is commercially available from Sola International Inc, is a combination of a polyoxyalkylene glycol diacrylate or dimethacrylate monomer; a monomer including a recurring unit derived from at least one radical-polymerisable bisphenol monomer capable of forming a homopolymer having a high refractive index of more than 1.55; and a urethane monomer having 2 to 6 terminal groups selected from a group including acrylic and methacrylic groups. Finalite™ is a high index resin that is commercially available from Sola International. MR7™ and MR10™ are that form thiourethane polymers after polymerisation. MR7™ and MR10™ are commercially available from Mitsui Chemicals.

The above primer coating was spun coated onto the back surface of the lenses. The spin speed was 600 rpm and the spin time was 30 seconds. The coated lenses were then cured using a "Fusion" UV lamp, "D" lamp. After the curing of the primer coating layer, the lenses were coated with hard coating solutions by the dipping method. The hard coating was then cured in an oven for three hours at 120° C. An AR coating was then applied using a traditional vacuum multilayer deposition method. The finished lenses were conditioned for 24 hours at room temperature before testing.

Twenty lenses were needed for each group in a drop ball impact test. The impact test results of lenses with primer coating layer (Table 1) are compared with the results of lenses without a primer coating layer (Table 2). In this test, the drop ball was 16.36 grams, the dropping height was 50 inches, and the impact energy was 0.20 J.

TABLE 1

Impact test results

| | CR-39 ™ | Spectralite ™ | Finalite ™ | MR7 ™ | MR10 ™ |
|---|---|---|---|---|---|
| Number of lenses | 20 | 20 | 20 | 20 | 20 |
| Primer coating layer | Yes | Yes | Yes | Yes | Yes |
| Hard coating | Yes | Yes | Yes | Yes | Yes |
| AR coating | Yes | Yes | Yes | Yes | Yes |
| Adhesion | Pass | Pass | Pass | Pass | Pass |
| FDA impact drop ball test | Pass | Pass | Pass | Pass | Pass |

TABLE 2

Control impact test results

|  | CR-39 ™ | Spectra-lite ™ | Finalite ™ | MR7 ™ | MR10 ™ |
| --- | --- | --- | --- | --- | --- |
| Number of lenses | 20 Control | 20 Control | 20 Control | 20 Control | 20 Control |
| Primer coating layer | No | No | No | No | No |
| Hard coating | Yes | Yes | Yes | Yes | Yes |
| AR coating | Yes | Yes | Yes | Yes | Yes |
| Adhesion | Pass | Pass | Pass | Pass | Pass |
| FDA impact drop ball test | Fail | Fail | Fail | Fail | Fail |

Example 2

Primer Solution Formulation B

| Components |  | Weight(grams) |
| --- | --- | --- |
| BYK-371 | Leveling agent made by BYK chemie | 0.03 |
| Vectomer ™ 2020 | Vinyl ether monomer made by Morflex | 12 |
| Epolight 100MF | Epoxy monomer made by Kyoeisha | 5.3 |
| Cyracure 6974 | Cationic UV initiator from Union Carbide | 2.7 |
| Isopropyl Alcohol | Solvent, alcohol | 23 |
| Methyl Isobutyl Ketone | Solvent, ketone | 57 |
| Total |  | 100.03 |

The lens samples used in this impact test were all −2.00 Stock lenses with centre thickness about 1 mm. The lenses can be cast or surfaced to the right through power and centre thickness.

Lenses from different materials were used in this example. These materials were CR-39™, Spectralite™, Finalite™, MR7™ and MR10™.

The above primer coating composition was spun onto the back surface of the lenses. The spin speed was 600 rpm and the spin time was 30 seconds. The coated lenses were then cured using a "Fusion" UV lamp, "D" lamp. After the curing of the primer coating composition, the lenses were coated with hard coating solutions by the dipping method. The hard coating was cured in an oven for three hours at 120° C. An AR coating was then applied using traditional vacuum multilayer deposition method. The finished lenses were then conditioned for 24 hours at room temperature before testing.

Twenty lenses were needed for each group in the test. The impact test results of lenses with primer coating layer (Table 3) are compared with the results of lenses without a primer coating layer (Table 4). In this test, the drop ball was 16.36 grams, the dropping height was 50 inches, and the impact energy was 0.20 J.

TABLE 3

Impact test results

|  | CR-39 ™ | Spectra-lite ™ | Finalite ™ | MR7 ™ | MR10 ™ |
| --- | --- | --- | --- | --- | --- |
| Number of lenses | 20 | 20 | 20 | 20 | 20 |
| Primer coating layer | Yes | Yes | Yes | Yes | Yes |
| Hard coating | Yes | Yes | Yes | Yes | Yes |
| AR coating | Yes | Yes | Yes | Yes | Yes |
| Adhesion | Pass | Pass | Pass | Pass | Pass |
| FDA impact drop ball test | Pass | Pass | Pass | Pass | Pass |

TABLE 4

Control impact test results

|  | CR-39 ™ | Spectra-lite ™ | Finalite ™ | MR7 ™ | MR10 ™ |
| --- | --- | --- | --- | --- | --- |
| Number of lenses | 20 Control | 20 Control | 20 Control | 20 Control | 20 Control |
| Primer coating layer | No | No | No | No | No |
| Hard coating | Yes | Yes | Yes | Yes | Yes |
| AR coating | Yes | Yes | Yes | Yes | Yes |
| Adhesion | Pass | Pass | Pass | Pass | Pass |
| FDA impact drop ball test | Fail | Fail | Fail | Fail | Fail |

Example 3

Primer Solution Formulation C

| Components |  | Weight(grams) |
| --- | --- | --- |
| BYK-371 | Leveling agent made by BYK chemie | 0.03 |
| Vectomer ™ 2020 | Vinyl ether monomer made by Morflex | 8 |
| Epolight 100MF | Epoxy monomer made by Kyoeisha | 4 |
| CN 962 | Acrylate made by Sartomer | 10 |
| Cyracure 6974 | Cationic UV initiator from Union Carbide | 1 |
| Vicure 55 | Free radical UV initiator from Akzo Nobel Chemicals | 1 |
| Isopropyl Alcohol | Solvent, alcohol | 22 |
| Methyl Isobutyl Ketone | Solvent, ketone | 54 |
| Total |  | 100.03 |

The lens samples used in this impact test are all −2.00 Stock lenses with centre thickness about 1 mm. The lenses can be cast or surfaced to the right through power and centre thickness.

Lenses from different materials were used in this example. These materials are CR-39™, Spectralite™, Finalite™, MR7™ and MR10™.

The above primer coating was spun on the back surface of the lenses only, the spin speed was 600 rpm, the spin time was 30 seconds. The coated lenses were cured through a "Fusion" UV lamp, "D" lamp. After the curing of the primer, the lenses were coated with hard coating solutions by dipping method. The hard coating was cured in an oven for three hours at 120° C.

The AR coating was applied by traditional vacuum multilayer deposition method.

The finished lenses are conditioned for 24 hours at room temperature before testing. Twenty lenses are needed for each group in the test. The impact test results of lenses with primer coating layer (Table 5) are compared with the results of lenses without a primer coating layer (Table 6). In this test, the drop ball weight was 16.36 grams, the dropping height was 50 inches, the impact energy was 0.20 J.

TABLE 5

Impact test results

|  | CR-39 ™ | Spectralite ™ | Finalite ™ | MR7 ™ | MR10 ™ |
|---|---|---|---|---|---|
| Number of lenses | 20 | 20 | 20 | 20 | 20 |
| Primer coating layer | Yes | Yes | Yes | Yes | Yes |
| Hard coating | Yes | Yes | Yes | Yes | Yes |
| AR coating | Yes | Yes | Yes | Yes | Yes |
| Adhesion | Pass | Pass | Pass | Pass | Pass |
| FDA impact drop ball test | Pass | Pass | Pass | Pass | Pass |

TABLE 6

Control impact test results

|  | CR-39 ™ | Spectralite ™ | Finalite ™ | MR7 ™ | MR10 ™ |
|---|---|---|---|---|---|
| Number of lenses | 20 | 20 | 20 | 20 | 20 |
|  | Control | Control | Control | Control | Control |
| Primer coating layer | No | No | No | No | No |
| Hard coating | Yes | Yes | Yes | Yes | Yes |
| AR coating | Yes | Yes | Yes | Yes | Yes |
| Adhesion | Pass | Pass | Pass | Pass | Pass |
| FDA impact drop ball test | Fail | Fail | Fail | Fail | Fail |

Finally, it will be appreciated that there may be other variations and modifications made to the embodiments described herein that are also within the scope of the present invention.

The invention claimed is:

1. A method of preparing an optical element having a primer layer, the method including:
   providing an optical element;
   coating a surface of the optical element with a coating composition consisting of:
   i. an epoxy monomer;
   ii. a vinyl ether monomer;
   iii. a cationic photoinitiator; and
   iv. a solvent
   in amounts effective to form a primer layer on a surface of the optical element after a single polymerization step of cationically polymerising the coating composition; and
   cationically polymerising the coating composition to form the primer layer on the surface of the optical element.

2. A method of preparing an optical element according to claim 1, wherein the method includes applying a further coating on the optical element.

3. A method of preparing an optical element according to claim 2, wherein the further coating is an anti-reflection coating.

4. A method of preparing an optical element according to claim 1, wherein the coating composition contains 2 to 8% by weight of the epoxy monomer and 8 to 16% by weight of the vinyl ether monomer.

5. A method of preparing an optical element according to claim 4, wherein the coating composition contains 4 to 6% by weight of the epoxy monomer and 10 to 14% by weight of the vinyl ether monomer.

6. A method of preparing an optical element according to claim 1, wherein the vinyl ether monomer is selected from the group consisting of alkyl vinyl ethers, alkoxyalkyl vinyl ethers, hydroxyalkyl vinyl ethers, and vinyl ether resins.

7. A method of preparing an optical element according to claim 6, wherein the vinyl ether monomer is a polyvinyl ether.

8. A method of preparing an optical element according to claim 7, wherein the polyvinyl ether is selected from the group consisting of 1,3-benzenedicarboxylic acid, bis [4-(ethenyloxy)butyl]ester; pentanedioic acid, bis[[4-[(ethenyloxy)methyl]cyclohexyl]methyl]ester; butanedioic acid, bis [4-ethenyloxy)butyl]ester; hexanedioic acid, bis[4-(thenyloxy)butyl]ester; carbamic acid, (methylenedi-4,1-phenylene)bis-, bis[4-(ethenyloxy)butyl]ester; carbamic acid, (4-methyl-1,3-phenylene)bis-, bis[4-(ethenyloxy)butyl]ester; 1,2,4-benzenetricarboxylic acid, tris[4-ethenyloxy)butyl]ester; an aromatic polyester divinyl ether; and an aromatic urethane divinyl ether.

9. A method of preparing an optical element according to claim 7, wherein the polyvinyl ether is an aliphatic urethane divinyl ether.

10. A method of preparing an optical element according to claim 6, wherein the vinyl ether monomer is a urethane vinyl ether.

11. A method of preparing an optical element according to claim 1, wherein the epoxy monomer has an average of at least two epoxy groups per molecule.

12. A method of preparing an optical element according to claim 11, wherein the epoxy monomer is selected from the group consisting of ethylene glycol diglycidyl ether, diethylene glycol diglycidyl ether, polyethylene glycol diglycidyl ether, propylene glycol diglycidyl ether, dipropylene glycol diglycidyl ether, tripropylene glycol diglycidyl ether, polypropylene glycol diglycidyl ether, neopentyl glycol diglycidyl ether, 1,6 hexanediol diglycidyl ether, glycerine diglycidyl ether, trimethylol propane triglycidyl ether, bisphenol-A diglycidyl ether (BPADGE), bisphenol-F diglycidyl ether, and their extended chain analogs, 1,4-butanediol diglycidyl ether, diglycidyl ethers of tetrabromo-bisphenol-A, epoxy based ethers of 4,4'-biphenylene, such as 4,4'-diglycidyloxybiphenyl.

13. A method of preparing an optical element according to claim 12, wherein the epoxy monomer is trimethylol propane triglycidyl ether.

14. A method of preparing an optical element according to claim 1, wherein the step of cationically polymerising the coating composition includes activating the cationic photoinitiator.

15. A method of preparing an optical element according to claim 14, wherein the cationic photoinitiator is UV activated.

16. A method of preparing an optical element according to claim 15, wherein the coating composition contains 0.5 to 4% by weight of the cationic photoinitiator.

17. A method of preparing an optical element according to claim 1, wherein the solvent is a mixture of a ketone solvent and a lower alcohol solvent.

18. A method of preparing an optical element according to claim 1, wherein the optical element is an ophthalmic lens.

19. A method of preparing an optical element according to claim 18, wherein the ophthalmic lens has a centre thickness of about 1 mm.

20. A method of preparing an optical element having a primer layer, the method including:
    providing an optical element;
    coating a surface of the optical element with a coating composition consisting of:
        i. an epoxy monomer;
        ii. a vinyl ether monomer;
        iii. a cationic photoinitiator;
        iv. a solvent; and
        v. a supplementary polymerisable monomer
    in amounts effective to form a primer layer on a surface of the optical element after a single polymerization step of cationically polymerising the coating composition; and
    cationically polymerising the coating composition to form the primer layer on the surface of the optical element; wherein the supplementary polymerisable monomer has greater than one acrylate moiety per molecule.

21. A method of preparing an optical element according to claim 20, wherein the supplementary polymerisable monomer is a (meth)acrylate monomer.

22. A method of preparing an optical element according to claim 21, wherein the supplementary polymerisable monomer is a urethane monomer having 1 to 6 terminal acrylic or methacrylic groups.

23. A method of preparing an optical element according to claim 22, wherein the supplementary polymerisable monomer is a urethane acrylate.

24. A method of preparing an optical element having a primer layer, the method including:
    providing an optical element;
    coating a surface of the optical element with a coating composition consisting of:
        i. an epoxy monomer,
        ii. a vinyl ether monomer,
        iii. a cationic photoinitiator,
        iv. at least one solvent, and
        v. a leveling agent,
    in amounts effective to form a primer layer on a surface of the optical element after a step of cationically polymerizing the coating composition; and
    cationically polymerising the coating composition to form the primer layer on the surface of the optical element.

* * * * *